March 8, 1927.
C. FISCHER
1,620,252
MOUNT FOR FINGER RING FACINGS
Filed March 17, 1926
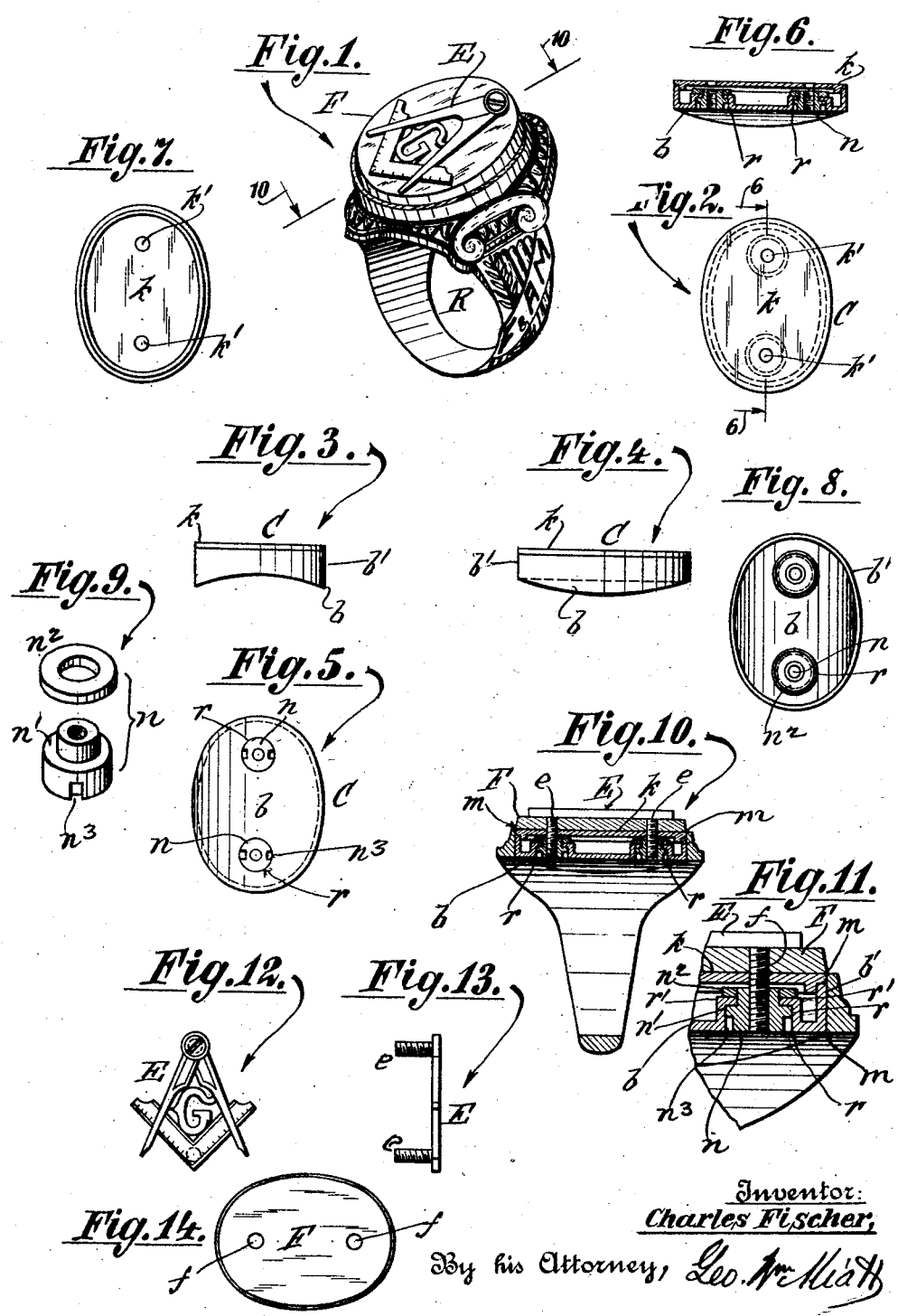
Inventor:
Charles Fischer,
By his Attorney, Patented Mar. 8, 1927.

1,620,252

UNITED STATES PATENT OFFICE.

CHARLES FISCHER, OF NEW YORK, N. Y.

MOUNT FOR FINGER-RING FACINGS.

Application filed March 17, 1926. Serial No. 95,268.

The object of my invention is to afford simple but effective means whereby various emblems, letters, monograms, signets, or ornate designs may be interchangeably mounted on the facing of a finger ring, so that the purchaser of the article may acquire therewith a plurality of facing elements of different characters which can be substituted, one for another, without the aid of skilled labor, all as hereinafter fully set forth, the invention consisting in the specific construction, combination and arrangement of component parts of the mount described and claimed specifically, whereby these and other advantageous results are attained.

In the accompanying drawings I illustrate a practical embodiment of the essential features of my invention as applied to a finger ring.

Fig. 1, represents an enlarged perspective view of a finger ring made in accordance with my invention and embellished with a well known fraternity emblem;

Fig. 2, is a top view of the mount casing before insertion in the mortise formed for its reception in the ring;

Fig. 3, is an end view of said casing; and

Fig. 4, is a side elevation thereof;

Fig. 5, is a view of the under side of the casing;

Fig. 6, is a section taken upon plane of line 6—6, Fig. 2;

Fig. 7, is a view of the underside of the cover plate of the casing;

Fig. 8, is a view of the inner side of the casing, the cover plate being removed;

Fig. 9, is a perspective view of the component parts of one of the nut members of the casing;

Fig. 10, is a sectional elevation taken upon plane of line 10—10, Fig. 1;

Fig. 11, is a sectional detail on a still larger scale, illustrating the emblem securing means;

Fig. 12, is a face view of the emblem shown in Fig. 1;

Fig. 13, is a side elevation thereof;

Fig. 14, is a face view of the emblem backing shown in Figs. 1, 10 and 11.

I herein show and describe my improved facing mount as adapted and applied to a finger ring R, which may be of any superficial design provided it is formed with a mortise $m$, for the reception of the casing C, of the mount. In the present case the mortise is elliptical in configuration, and the casing C, is made to conform to and fit within the mortise $m$, to the sides of which it is rigidly attached by suitable means known in the art, thus constituting an integral part of the ring.

The casing C, consists of a flanged base plate $b$, formed with recesses $r$, $r$, for the accommodation of the nuts $n$, $n$, which are thus countersunk in the underside of said base plate $b$, as will be seen by reference more particularly to Figs. 6, 10 and 11, of the drawings, thereby removing them from contact with the finger. Referring especially to Fig. 11, it will be seen that the side walls of the recesses $r$, $r$, are formed with inturned shoulders $r'$, $r'$, with which the shoulders $n'$, $n'$, on the nuts $n$, $n$, contact, and to prevent the withdrawal of the nuts $n$, $n$, from the recesses $r$, $r$, they are furthermore provided with retaining collars $n^2$, $n^2$, which also bear against the shoulders $r'$, $r'$, of the recesses $r$, $r$, thus sustaining the nuts in position in the recesses $r$, $r$, but admitting of the rotation of the nuts by a suitable implement formed for engagement with the manipulative notches $n^3$, formed for the purpose in the undersides of the nuts.

The retaining collars $n^2$, $n^2$, are rigidly attached to the nuts $n$, $n$, after the insertion of the latter in their recesses $r$, $r$, and before the application of the cover plate $k$, of the casing, which cover plate $k$, is rigidly attached to the circumferential flange $b'$, of the base plate $b$.

The emblem E, to be mounted on the casing is formed on its rear side with screw studs $e$, $e$, for engagement with the nuts $n$, $n$, as shown in Figs. 10 and 11, of the drawings; and by the term "emblem" as herein used in this connection I mean to designate and include any device with which it may be desired to embellish the facade of the ring.

This emblem may obviously be imposed directly on the cover plate $k$, of the casing C, which cover plate $k$, is formed with perforations $k'$, $k'$, for the accommodation of the screws $e$, $e$, but by preference an emblem backing or facade plate F, of onyx, enamel, metal or any suitable material is interposed between the emblem E, and the cover plate $k$, of the casing C, said facade plate F, being formed with perforations $f$, $f$, for the accommodation of the screws $e$, $e$, on the back of the emblem E, so that the latter is utilized to secure the facade plate F, in position on the cover $k$, of the casing C, as illustrated in Figs. 10 and 11, of the drawings.

By the use of various appropriate facade plates F, in conjunction with emblems of suitable character and design, a variety of changes and effects may be attained by the owner of the ring by substitution, the removal and substitution of emblems and facade plates being effected in a simple manner, and without the need of special skill.

What I claim as my invention and desire to secure by Letters Patent, is:—

A finger ring facing mount of the character designated, comprising a casing for insertion in a ring mortise, the base plate of said casing being formed with recesses the side walls of which are flanged, shouldered and rotatable nuts fitting in said recesses and against the flanges thereof and formed with rigidly attached retaining collars which also contact with said recess flanges, a perforated cover plate rigidly attached to the flanges of the base plate, and an emblem formed with screw studs for engagement with said nuts, as and for the purpose set forth.

CHARLES FISCHER.